United States Patent
Zeng et al.

(10) Patent No.: US 10,225,874 B2
(45) Date of Patent: Mar. 5, 2019

(54) RESOURCE ALLOCATION METHOD AND EQUIPMENT FOR DEVICE-TO-DEVICE SIGNAL TRANSMISSION

(71) Applicant: CHINA ACADEMY OF TELECOMMUNICATIONS TECHNOLOGY, Beijing (CN)

(72) Inventors: Erlin Zeng, Beijing (CN); Yali Zhao, Beijing (CN); Jing Fu, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 15/125,769

(22) PCT Filed: Mar. 16, 2015

(86) PCT No.: PCT/CN2015/074296
§ 371 (c)(1),
(2) Date: Sep. 13, 2016

(87) PCT Pub. No.: WO2015/139592
PCT Pub. Date: Sep. 24, 2015

(65) Prior Publication Data
US 2017/0006653 A1 Jan. 5, 2017

(30) Foreign Application Priority Data
Mar. 18, 2014 (CN) .......................... 2014 1 0101192

(51) Int. Cl.
*H04W 72/08* (2009.01)
*H04W 76/14* (2018.01)
(Continued)

(52) U.S. Cl.
CPC ............. *H04W 76/14* (2018.02); *H04W 4/06* (2013.01); *H04W 72/042* (2013.01); *H04W 72/085* (2013.01)

(58) Field of Classification Search
CPC ............. H04W 76/023; H04W 72/042; H04W 72/085; H04W 4/06; H04W 76/14;
(Continued)

(56) References Cited

U.S. PATENT DOCUMENTS

2009/0325625 A1* 12/2009 Hugl ...................... H04W 52/16
455/522
2012/0020213 A1 1/2012 Horneman et al.
(Continued)

FOREIGN PATENT DOCUMENTS

CN 102638893 A 8/2012
CN 103052164 A 4/2013
(Continued)

OTHER PUBLICATIONS

International Preliminary Report on Patentability (IPRP) for PCT/CN2015/074296 dated Sep. 20, 2016 with English translation obtained from Patentscope.
(Continued)

Primary Examiner — Jung Liu
(74) Attorney, Agent, or Firm — Ladas & Parry, LLP

(57) ABSTRACT

The present disclosure provides a resource allocation method and a resource allocation equipment for D2D signal transmission. The resource allocation method includes steps of: determining, by a base station, a resource allocation mode to be adopted by a UE, the resource allocation mode including a network scheduling mode and a UE autonomous selection mode; and transmitting, by the base station, configuration information to the UE, the configuration information including at least one of: indication information indi-
(Continued)

cating whether or not the UE is permitted to determine a resource in accordance with the network scheduling mode and/or UE autonomous selection mode, QoS information of a D2D service corresponding to each resource allocation mode, and resource allocation information for determining the resource in the case that the UE adopts the UE autonomous selection mode.

16 Claims, 3 Drawing Sheets

(51) Int. Cl.
*H04W 72/04* (2009.01)
*H04W 4/06* (2009.01)

(58) Field of Classification Search
CPC .............. H04W 40/246; H04W 8/005; H04W 72/1289; H04W 72/0406; H04W 72/0413; H04W 72/12; H04W 92/18; H04L 67/16; H04L 1/1822; H04L 1/1896
See application file for complete search history.

(56) References Cited

U.S. PATENT DOCUMENTS

| | | | |
|---|---|---|---|
| 2013/0150061 A1* | 6/2013 | Shin | H04W 4/70 455/450 |
| 2013/0157676 A1 | 6/2013 | Baek et al. | |
| 2013/0258996 A1* | 10/2013 | Jung | H04W 72/1284 370/330 |
| 2013/0322413 A1* | 12/2013 | Pelletier | H04W 72/1289 370/336 |
| 2014/0038653 A1 | 2/2014 | Mildh et al. | |
| 2014/0056220 A1* | 2/2014 | Poitau | H04W 76/14 370/328 |
| 2014/0056250 A1* | 2/2014 | Cattoni | H04W 72/082 370/329 |
| 2015/0045018 A1* | 2/2015 | Liu | H04L 1/00 455/426.1 |
| 2015/0156743 A1 | 6/2015 | Lee et al. | |
| 2015/0230250 A1* | 8/2015 | Kim | H04W 76/14 455/450 |
| 2015/0264677 A1 | 9/2015 | He et al. | |

FOREIGN PATENT DOCUMENTS

| | | |
|---|---|---|
| CN | 103493529 A | 1/2014 |
| CN | 103533500 A | 1/2014 |
| CN | 104202821 A | 12/2014 |
| WO | 2014/014326 A1 | 1/2014 |
| WO | 2014032222 A1 | 3/2014 |
| WO | 2015/138083 A1 | 9/2015 |

OTHER PUBLICATIONS

Extended European Search Report for EP 15765448.4, dated Jan. 20, 2017.
"Status Report to TSG 1 Work plan related evaluation". 3GPP Draft; RP-140416 Status Report for SI Study on LTE Device to Device Proximity Services. 3rd Generation Partnership Project (3GPP). Mobile Competence Centre; 650. Route Des Lucioles; F-06921 SOP, vol. TSG RAN. No. Fukuoka. Japan; 20140303-20140306, Mar. 5, 2014. XP050781457. Retrieved from the Internet: URL:http://www.3gpp.org/ftp/Meetings_3GPP_SYNC/RAN/Docs/ [retrieved on Mar. 5, 2014].
Qualcomm Incorporated: "Resource allocation aspects of 1: M D2D broadcast Communication", 3GPP Draft; R2-140714—Resorce Allocation Aspect of Broadcast Communication. 3rd Generation Partnership Project (3GPP). Mobile Competence Centre; 650, Route Des Lucioles; F-06921 Sophia-Antipolis CE, vol. RAN WG2. No. Prague. Czech Republic; 20140210-20140214, Feb. 9, 2014. XP050792008. Retrieved from the Internet: URL:http://www.3gpp.org/ftp/Meetings_3GPP_SYNC/RAN2/Docs/ [retrieved on Feb. 9, 2014].
From Chinese Application No. 201410101192.5, Office Action dated Dec. 5, 2017 and its English translation from Global Dossier.
From Japanese Application No. 2016/554381, Office Action dated Oct. 10, 2017 and its English translation from Global Dossier.
Liu et al. "Mode Selection for Device-to-Device (D2D) Communication under LTE Advanced Networks"; Workshop on Cooperative and Cognitive Mobile Networks; Jun. 15, 2012; pp. 5563-5567.
English translation of Written Opinion of the International Search Authority for PCT/CN2015/074296 dated Jun. 12, 2015 obtained from Patentscope.
Orange., "Network Control and Flexible Resource Sharing between Cellular and D2D 1-26 Communication within Network Coverage", 3GPP TSG-RAN WG1 Meeting #76 R1-140781, Feb. 14, 2014, Section 2.
International Search Report for PCT/CN2015/074296 dated Jun. 12, 2015 and its English translation provided by WIPO.
Written Opinion of the International Search Authority for PCT/CN2015/074296 dated Jun. 12, 2015 and its English translation provided by Google Translate.

\* cited by examiner

RESOURCE ALLOCATION METHOD AND EQUIPMENT FOR DEVICE-TO-DEVICE SIGNAL TRANSMISSION

CROSS-REFERENCE TO RELATED APPLICATIONS

The present application is the U.S. national phase of PCT Application No. PCT/CN2015/074296 filed on Mar. 16, 2015, which claims the priority of the Chinese patent application No. 201410101192.5 filed on Mar. 18, 2014 and entitled "Resource allocation method and equipment for device-to-device signal transmission", which are incorporated herein by reference in their entireties.

TECHNICAL FIELD

The present disclosure relates to the field of computers, in particular to a resource allocation method and a resource allocation equipment for device-to-device (D2D) signal transmission, and a resource determination method and a resource determination equipment for D2D signal transmission.

BACKGROUND (1) Conventional Mobile Communication System

In a Long Term Evolution (LTE) system, usually a network centralized control mode is adopted, i.e., as shown in FIG. 1, uplink and downlink data for a User Equipment (UE) is transmitted and received respectively under the control of a network (e.g., the UE may communicate with a core network via an evolved NodeB (eNB)). In addition, the data between the UEs is also forwarded and controlled via the network. Hence, there is no direct communication link between the UEs, and the UE is not permitted to transmit the uplink data by itself.

(2) D2D Proximity Service

In a future mobile communication system, a D2D direct communication mechanism is introduced, so as to meet users' requirements in a better manner and improve the information exchange efficiency.

As stipulated by the 3$^{rd}$ Generation Partnership Project (3GPP), the D2D proximity service includes D2D Discovery and D2D communication between mobile devices, which will be described hereinafter.

For ProSe Discovery, the UE may determine, using Evolved Universal Terrestrial Radio Access (E-UTRA), that another UE is located in proximity thereto. For example, on the basis of the ProSe Discovery, the D2D UE may find a taxi or a friend located in proximity thereto.

For ProSe Communication, a link may be directly established between two adjacent UEs (as shown in FIG. 2), so as to convert a communication link via a network into a local, direct communication link, thereby to save the bandwidth and improve the communication efficiency. Or, the direct communication link may be established between the two adjacent UEs, so as to acquire a stable, high-speed and economic communication service. The ProSe Communication is usually controlled or assisted by a network side, and even resources may be dynamically allocated by the eNB to the UEs for the ProSe Communication. A signaling link in FIG. 2 includes a link for direct communication between the devices (i.e., a D2D link) and links between the devices and a network node (i.e., device-to-node (D2N) links).

Radio resources for the ProSe Discovery and ProSe Communication may be allocated in a resource pool-based mode, i.e., the UE that needs the radio resources for the ProSe Discovery or ProSe Communication may select the radio resources from a resource pool in accordance with a certain rule. The ProSe Discovery and ProSe Communication may use non-dedicated radio resources, i.e., they may share the radio resources with an LTE cellular network.

For the D2D discovery, the UE may determine the resource for transmission in two modes, i.e., a UE autonomous selection mode in which the UE may initiatively select a resource from the resource pool for the data transmission, and a network scheduling mode in which the UE may transmit the data on a resource allocated by a base station.

The above-mentioned UE autonomous selection mode and the network scheduling mode have their own advantages and disadvantages. For example, for the UE autonomous selection mode, the UE may initiatively select the resource in accordance with a monitoring result. However, in the case that there are a large number of users or there is a strong interference, the UE may have a long waiting or backoff time, and the quality of service (QoS) may be adversely affected. For the network scheduling mode, control signaling overhead in the network may increase. In a word, the UE autonomous selection mode and the network scheduling mode may be applied to different scenarios, and the D2D communication will be adversely affected in the case that the resource allocation modes cannot be switched flexibly in accordance with the practical need.

Similarly, for the D2D communication, there also exist different resource allocation modes (i.e., the above-mentioned UE autonomous selection mode and network scheduling mode may also be used), and also there is currently no effective way for the flexible switch between these resource allocation modes.

Hence, there is an urgent need to provide a solution for enabling the UE to be efficiently switched between different resource allocation modes.

SUMMARY

The present disclosure provides a resource allocation method and a resource determination method for D2D signal transmission, so as to achieve the efficient switch between resource allocation modes for the D2D signal transmission, thereby to enable a UE to select the resource allocation mode in accordance with the practical need, as well as improve the D2D communication performance and the cellular communication performance.

In one aspect, the present disclosure provides in some embodiments a resource allocation method for D2D signal transmission, including steps of: determining, by a base station, a resource allocation mode to be adopted by a UE, the resource allocation mode including a network scheduling mode and a UE autonomous selection mode; and transmitting, by the base station, configuration information to the UE, the configuration information including at least one of: indication information indicating whether or not the UE is permitted to determine a resource in accordance with the network scheduling mode and/or UE autonomous selection mode, QoS information of a D2D service corresponding to each resource allocation mode, and resource allocation information for determining the resource in the case that the UE adopts the UE autonomous selection mode.

Optionally, the resource allocation method further includes: receiving, by the base station in advance, support capability for the resource allocation mode and resource requirement information reported by the UE; and determining, by the base station, the resource allocation mode to be adopted by the UE in accordance with the support capability reported by the UE.

Optionally, the step of transmitting, by the base station, the configuration information to the UE includes: transmitting, by the base station, the configuration information to the UE via broadcasting or dedicated signaling.

Optionally, in the case that the base station notifies the UE of determining the resource in accordance with the UE autonomous selection mode, the configuration information transmitted from the base station to the UE merely includes the resource allocation information.

Optionally, in the case that the base station indicates the UE to determine the resource in accordance with the network scheduling mode through the indication information, the base station further notifies the UE of information of a resource pool from which the resource is to be selected by the UE.

Optionally, the network scheduling mode is a mode in which the UE transmits a D2D signal on a resource selected by the UE initiatively from the resource pool, and the UE autonomous selection mode is a mode in which the UE transmits the D2D signal on a resource indicated by the resource allocation information.

In another aspect, the present disclosure provides in some embodiments a resource determination method for D2D signal transmission, including steps of: receiving, by a UE, configuration information from a base station, the configuration information including at least one of: indication information indicating whether or not the UE is permitted to determine a resource in accordance with a network scheduling mode and/or a UE autonomous selection mode, QoS information of a D2D service corresponding to each resource allocation mode, and resource allocation information for determining the resource in the case that the UE adopts the UE autonomous selection mode; and determining, by the UE, the resource allocation mode in accordance with the configuration information.

Optionally, the resource determination method further includes reporting, by the UE in advance, support capability for the resource allocation mode and resource requirement information to the base station.

Optionally, in the step of determining the resource allocation mode, in the case that the indication information in the configuration information received by the UE indicates the resource allocation mode to be adopted by the UE and the UE supports the resource allocation mode, the UE determines the resource in accordance with the resource allocation mode indicated in the indication information.

Optionally, in the step of determining the resource allocation mode, in the case that the configuration information received by the UE includes the QoS information of the D2D service corresponding to each resource allocation mode, the UE selects the resource allocation mode in accordance with QoS required by a currently-transmitted D2D signal.

Optionally, in the step of determining the resource allocation mode, in the case that the configuration information received by the UE includes the resource allocation information, the UE determines that the UE autonomous selection mode is to be adopted and determines the resource in accordance with the resource allocation information.

Optionally, the configuration information is transmitted from the base station to the UE via broadcasting or dedicated signaling.

Optionally, the network scheduling mode is a mode in which the UE transmits the D2D signal on the resource selected by the UE initiatively from a resource pool, and the UE autonomous selection mode is a mode in which the UE transmits the D2D signal on the resource indicated by the resource allocation information.

In yet another aspect, the present disclosure provides in some embodiments a resource allocation equipment for D2D signal transmission, including: a determination module configured to determine a resource allocation mode to be adopted by a UE, the resource allocation mode including a network scheduling mode and a UE autonomous selection mode; and a transmission module configured to transmit configuration information to the UE, the configuration information including at least one of: indication information indicating whether or not the UE is permitted to determine a resource in accordance with the network scheduling mode and/or UE autonomous selection mode, QoS information of a D2D service corresponding to each resource allocation mode, and resource allocation information for determining the resource in the case that the UE adopts the UE autonomous selection mode.

Optionally, the resource allocation device further includes a reception module configured to receive in advance support capability for the resource allocation mode and resource requirement information reported by the UE, and the determination module is further configured to determine the resource allocation mode to be adopted by the UE in accordance with the support capability reported by the UE.

Optionally, the transmission module is further configured to transmit the configuration information to the UE via broadcasting or dedicated signaling.

Optionally, in the case that it is required to notify the UE of determining the resource in accordance with the UE autonomous selection mode, the configuration information transmitted by the transmission module to the UE merely includes the resource allocation information.

Optionally, in the case that it is required to indicate the UE to determine the resource in accordance with the network scheduling mode through the indication information, the transmission module is further configured to notify the UE of information of a resource pool from which the resource is to be selected by the UE.

Optionally, the network scheduling mode is a mode in which the UE transmits a D2D signal on the resource selected by the UE initiatively from the resource pool, and the UE autonomous selection mode is a mode in which the UE transmits the D2D signal on the resource indicated by the resource allocation information.

In still yet another aspect, the present disclosure provides in some embodiments a resource determination equipment for D2D signal transmission, for use in a UE, including: a reception module configured to receive configuration information from a base station, the configuration information including at least one of: indication information indicating whether or not the UE is permitted to determine a resource in accordance with a network scheduling mode and/or a UE autonomous selection mode, QoS information of a D2D service corresponding to each resource allocation mode, and resource allocation information for determining the resource in the case that the UE adopts the UE autonomous selection mode; and a determination module configured to determine the resource allocation mode in accordance with the configuration information.

Optionally, the resource determination device further includes a reporting module configured to report in advance support capability for the resource allocation mode and resource requirement information to the base station.

Optionally, during the determination of the resource allocation mode, in the case that the indication information in the configuration information received by the reception module indicates the resource allocation mode to be adopted by the UE and the UE supports the resource allocation mode, the determination module is further configured to determine the resource in accordance with the resource allocation mode indicated in the indication information.

Optionally, during the determination of the resource allocation mode, in the case that the configuration information received by the reception module includes the QoS information of the D2D service corresponding to each resource allocation mode, the determination module is further configured to select the resource allocation mode in accordance with QoS required by a currently-transmitted D2D signal.

Optionally, during the determination of the resource allocation mode, in the case that the configuration information received by the reception module includes the resource allocation information, the determination module is further configured to determine that the UE autonomous selection mode is to be adopted and determine the resource in accordance with the resource allocation information.

Optionally, the configuration information is transmitted from the base station to the UE via broadcasting or dedicated signaling.

Optionally, the network scheduling mode is a mode in which the UE transmits the D2D signal on the resource selected by the UE initiatively from a resource pool, and the UE autonomous selection mode is a mode in which the UE transmits the D2D signal on the resource indicated by the resource allocation information.

According to the embodiments of the present disclosure, the configuration information may be transmitted from the base station to the UE, so as to specifically indicate the resource allocation mode to be currently adopted. The UE may be efficiently switched between the different resource allocation modes in accordance with the configuration information from the base station. As a result, it is able to flexibly switch the resource allocation mode in accordance with the practical need, thereby to efficiently improve a resource utilization rate as well as the D2D communication performance.

BRIEF DESCRIPTION OF THE DRAWINGS

Drawings desired for the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

The present disclosure provides in some embodiments a resource allocation method for D2D signal transmission.

Figure 1:
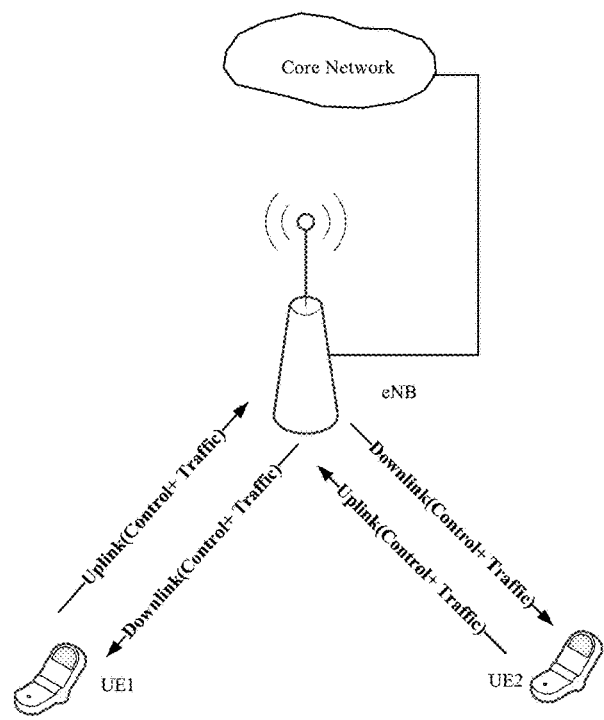
FIG. 1 is a schematic view showing communication between UEs in an LTE system in the related art.
Figure 2:
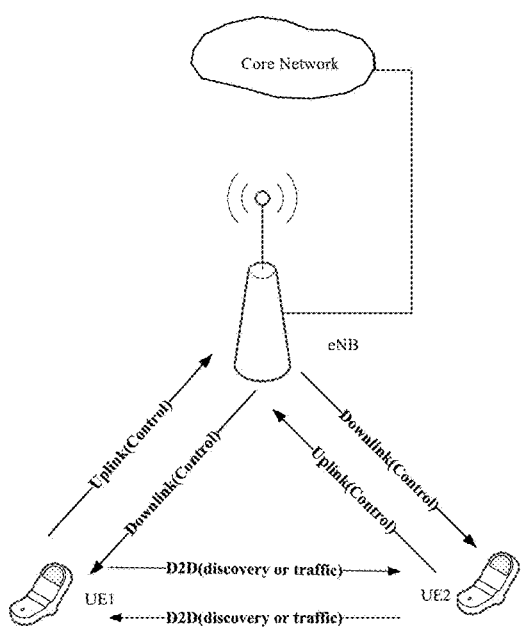
FIG. 2 is a schematic view showing communication between UEs in a D2D proximity service in the related art.
Figure 3:
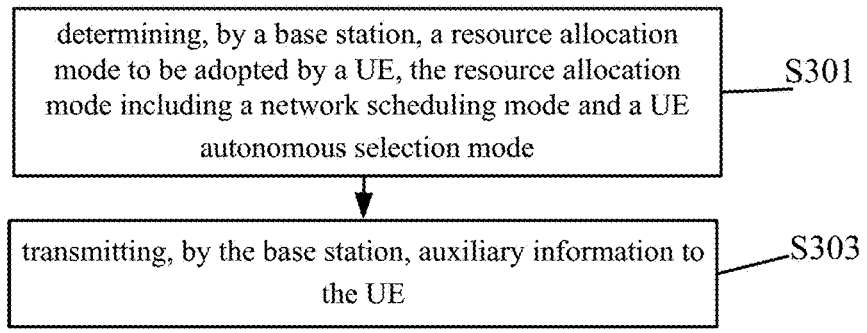
FIG. 3 is a flow chart of a resource allocation method for D2D signal transmission according to one embodiment of the present disclosure.

As shown in FIG. 3, the resource allocation method includes following steps.

Step S301 is to determine, by a base station, a resource allocation mode to be adopted by a UE. The resource allocation mode includes a network scheduling mode and a UE autonomous selection mode.

Step S303 is to transmit, by the base station, configuration information to the UE. The configuration information includes at least one of: indication information indicating whether or not the UE is permitted to determine a resource in accordance with the network scheduling mode and/or UE autonomous selection mode; QoS information of a D2D service (in the context, the D2D service includes a D2D discovery service and a D2D communication service) corresponding to each resource allocation mode; and resource allocation information for determining the resource in the case that the UE adopts the UE autonomous selection mode.

In one embodiment of the present disclosure, the resource allocation method further includes: receiving, by the base station in advance, support capability for the resource allocation mode and resource requirement information reported by the UE; and determining, by the base station, the resource allocation mode to be adopted by the UE in accordance with the support capability reported by the UE.

In one embodiment of the present disclosure, in the case that the base station notifies the UE of determining the resource in accordance with the UE autonomous selection mode, the configuration information transmitted from the base station to the UE merely includes the resource allocation information.

In addition, in the case that the base station indicates the UE to determine the resource in accordance with the network scheduling mode through the indication information, the base station further notifies the UE of information about a resource pool from which the resource is to be selected by the UE.

Optionally, the configuration information is transmitted by the base station to the UE via broadcasting or dedicated signaling.

In addition, the network scheduling mode is a mode in which the UE transmits a D2D signal (in the context, the D2D signal includes a D2D discovery signal and/or a D2D communication signal) on the resource selected by the UE initiatively from the resource pool; and the UE autonomous selection mode is a mode in which the UE transmits the D2D signal on the resource indicated by the resource allocation information.

The present disclosure further provides in some embodiments a resource determination method for D2D signal transmission.

Figure 4:
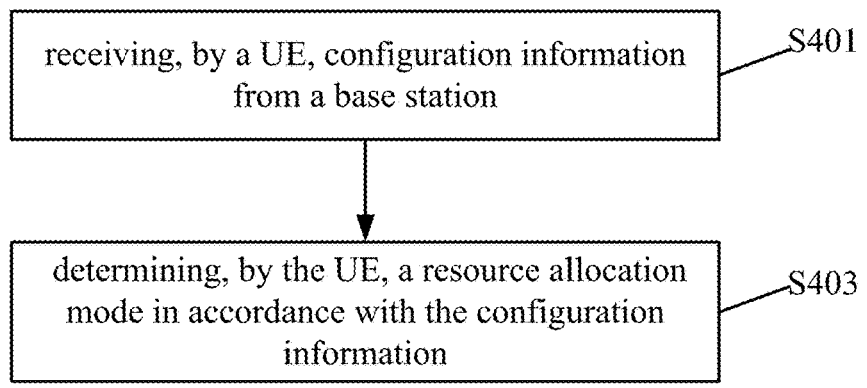
FIG. 4 is a flow chart of a resource determination method for D2D signal transmission according to one embodiment of the present disclosure.

As shown in FIG. 4, the resource determination method includes following steps.

Step S401 is to receive, by a UE, configuration information from a base station. The configuration information includes at least one of: indication information indicating whether or not the UE is permitted to determine a resource in accordance with a network scheduling mode and/or a UE autonomous selection mode; QoS information of a D2D service corresponding to each resource allocation mode; and resource allocation information for determining the resource in the case that the UE adopts the UE autonomous selection mode.

Step S403 is to determine, by the UE, the resource allocation mode in accordance with the configuration information.

In one embodiment of the present disclosure, the resource determination method further includes: reporting, by the UE in advance, support capability for the resource allocation mode and resource requirement information to the base station, so that the base station determines the resource allocation mode suitable for the UE.

In addition, in one embodiment of the present disclosure, in the step of determining the resource allocation mode, in the case that the indication information in the configuration information received by the UE indicates the resource allocation mode to be adopted by the UE and the UE supports the resource allocation mode, the UE determines the resource in accordance with the resource allocation mode indicated in the indication information.

In another embodiment of the present disclosure, in the step of determining the resource allocation mode, in the case that the configuration information received by the UE includes the QoS information of the D2D service corresponding to each resource allocation mode, the UE selects the resource allocation mode in accordance with QoS required by a currently-transmitted D2D signal.

In yet another embodiment of the present disclosure, in the step of determining the resource allocation mode, in the case that the configuration information received by the UE includes the resource allocation information, the UE determines that the UE autonomous selection mode is to be adopted and determines the resource in accordance with the resource allocation information.

The configuration information may be transmitted from the base station to the UE via broadcasting or dedicated signaling.

The network scheduling mode is a mode in which the UE transmits the D2D signal on the resource selected by the UE initiatively from a resource pool; and the UE autonomous selection mode is a mode in which the UE transmits the D2D signal on the resource indicated by the resource allocation information.

As can be seen from the above, the present disclosure provides a solution for the switch between the different resource allocation modes. During the actual application, the switch between the different resource allocation modes may be achieved as follows.

1) The UE reports the support capability for the D2D resource allocation mode to the base station.

2) The base station provides the configuration information to the UE via signaling. The configuration information may include information specifically indicating the resource allocation mode, or QoS-related parameters suitable for different resource allocation modes, or the resource allocation information in a certain resource allocation mode.

3) After receiving the configuration information, the UE selects the resource allocation mode based on the configuration information and in accordance with a predetermined rule.

Improvements in the embodiments of the present disclosure will be described hereinafter.

The UE may report the support capability for the D2D resource allocation mode to the base station, i.e., which resource allocation modes the UE may support. The base station provides the configuration information to the UE via signaling (e.g., via broadcasting or dedicated signaling). The configuration information may include at least one of: the indication information indicating whether or not the UE is permitted to determine the resource in accordance with the network scheduling mode and/or the UE autonomous selection mode; and/or, the QoS information of the D2D service corresponding to each resource allocation mode; and/or, resource allocation information of the network scheduling mode.

After the receipt of the configuration information, the UE may select the resource allocation mode based on the configuration information and in accordance with a predetermined rule. The predetermined rule will be described hereinafter.

(1) In the case that the information specifically indicating a resource allocation mode has been received from the base station and the UE supports this resource allocation mode, the indicated resource allocation mode may be adopted.

(2) In the case that the QoS information of the D2D service corresponding to each resource allocation mode has been received, the resource allocation mode may be selected in accordance with the QoS requirement for the to-be-transmitted D2D signal. For example, in the case that the configuration information includes a delay threshold and the UE determines that a delay required by the current D2D signal is lower than this delay threshold, the UE may select the network scheduling mode, and otherwise, the UE may select the UE autonomous selection mode.

(3) In the case that resource allocation information of the network scheduling mode has been received from the base station, the network scheduling mode may be selected, as implicitly indicated in the resource allocation information.

For ease of understanding, the technical solutions of the present disclosure will be described hereinafter by taking the transmission of a D2D discovery signal as an example. It should be appreciated that, the following contents may also be applied to the other D2D signals (e.g., a D2D communication signal).

Example 1: UE Autonomous Selection Mode and Network Scheduling Mode of Resource Allocation for D2D Discovery In the UE autonomous selection mode, the UE may initiatively select the resource from the resource pool to transmit the D2D discovery signal. The resource pool may be configured by network signaling. Typically, the resource may be selected by monitoring carriers. To be specific, the UE may monitor the configured resource pool, and in the case that there is an idle resource, it may be selected. Otherwise, the UE continues to wait and monitor the resource pool.

In the network scheduling mode, the base station may allocate a dedicated D2D discovery resource for the UE in a semi-static manner (e.g., the resource may be allocated by an eNB for the UE upon receiving a request therefrom).

The above-mentioned two resource allocation modes have their own advantages and disadvantages, which are shown in Table 1.

TABLE 1

|  | UE autonomous selection mode | Network scheduling mode |
|---|---|---|
| Air-interface signaling overhead | Small | Large |
| Validity of discovery resource | Low (in the case of more UEs) | High |
| Signaling overhead of eNBs | Small | Large |

In Table 1, in the case that there are more UEs and the UE autonomous selection mode is adopted, it may takes a long waiting time to find the idle resource, so it is impossible to meet some QoS requirements (e.g., a delay requirement). At this point, the base station may determine the resource allocation mode suitable for a current scenario in accordance with the actual number of the UEs, and transit the resource allocation mode to the UE through the configuration information.

Example 2: Provision of Configuration Information and Selection of Resource Allocation Mode For the provision of the configuration information, one kind of configuration information provided by the base station may include an indicator related to QoS parameters. For example, the base station may provide a delay threshold Td to the UE. In the case that the UE is desired to perform the D2D communication, it may make a decision on the QoS requirement corresponding to the current service. In the case that the desired delay is greater than Td, it means that the delay requirement for the current service is not high, and at this point, the UE may perform the D2D transmission in the UE autonomous selection mode. In the case that the desired delay is less than Td, the network scheduling mode may be selected (i.e., the UE may send a request for a dedicated channel resource to a network side).

For the selection of the resource allocation mode, another kind of configuration information provided by the base station may include indication information indicating whether or not the UE is permitted to determine the resource in accordance with the UE autonomous selection mode or the network scheduling mode. For example, the base station may determine whether or not a UE newly accessing the network is permitted to adopt the UE autonomous selection mode or the network scheduling mode in accordance with the number of the currently active D2D UEs. In the case that there are fewer UEs, the UE autonomous selection mode may be adopted by the UE, so as to reduce the air-interface signaling overhead. Otherwise, the UEs having a higher priority level may adopt the network scheduling mode, so as to reduce collision or delay.

For the selection of the resource allocation mode, the base station may indicate the resource allocation mode in an implicit manner. For example, a predetermined rule may be used. In the case that the base station has allocated a resource in the network scheduling mode to the UE, the UE may automatically adopt the network scheduling mode, and at this point, the UE autonomous selection mode is prohibited.

The indication information may be provided via broadcasting or dedicated signaling.

Example 3: Related Procedures for UE in an Idle State

The UE in a connected state is mainly taken into consideration in the above examples. For the UE in an idle state, usually the UE autonomous selection mode needs to be adopted. This is because a standby resource pool may be notified by system information in the UE autonomous selection mode, and it is unnecessary for the UE to be in the connected state. The above-mentioned method may be used in an extended manner for the UE in the idle state. For example, the QoS-related configuration information in Example 2 may be used. In the case that the UE in the idle state determines that the currently desired delay is too high and the UE autonomous selection mode is inappropriate, the establishment of a Radio Resource Control (RRC) connection may be triggered, and the UE may be in the connected state for the subsequent selection of the resource allocation modes. If desired, the network scheduling mode may be selected by the UE in the connected state.

The present disclosure further provides in some embodiments a resource allocation equipment for D2D signal transmission.

Figure 5:
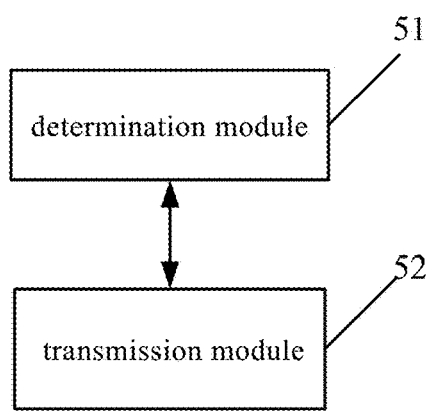
FIG. 5 is a block diagram of a resource allocation equipment for D2D signal transmission according to one embodiment of the present disclosure.

As shown in FIG. 5, the resource allocation equipment includes: a determination module 51 configured to determine a resource allocation mode to be adopted by a UE, the resource allocation mode including a network scheduling mode and an independent selection mode; and a transmission module 52 configured to transmit configuration information to the UE.

The configuration information includes at least one of: indication information indicating whether or not the UE is permitted to determine a resource in accordance with the network scheduling mode and/or independent selection mode; QoS information of a D2D service corresponding to each resource allocation mode; and resource allocation information for determining the resource in the case that the UE adopts the independent selection mode.

The resource allocation equipment may further include a reception module (not shown) configured to receive in advance support capability for the resource allocation mode and resource requirement information reported by the UE. The determination module 51 is further configured to determine the resource allocation mode to be adopted by the UE in accordance with the support capability reported by the UE.

Optionally, the transmission module 52 is further configured to transmit the configuration information to the UE via broadcasting or dedicated signaling.

Optionally, in the case that it is required to notify the UE of determining the resource in accordance with the independent selection mode, the configuration information transmitted by the transmission module 52 to the UE merely includes the resource allocation information.

In addition, in the case that it is required to indicate the UE to determine the resource in accordance with the network scheduling mode through the indication information, the transmission module 52 is further configured to notify the UE of information of a resource pool from which the resource is to be selected by the UE.

Optionally, the network scheduling mode is a mode in which the UE transmits a D2D signal on the resource selected by the UE independently from the resource pool; and the independent selection mode is a mode in which the UE transmits the D2D signal on the resource indicated by the resource allocation information.

The present disclosure further provides in some embodiments a resource determination equipment for D2D signal transmission, for use in a UE.

Figure 6:
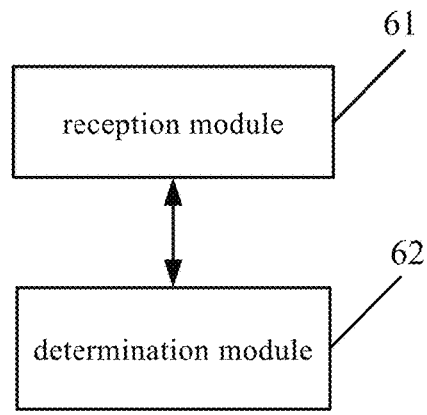
FIG. 6 is a block diagram of a resource determination equipment for D2D signal transmission according to one embodiment of the present disclosure.

As shown in FIG. 6, the resource determination equipment includes: a reception module 61 configured to receive configuration information from a base station, and a determination module 62 configured to determine the resource allocation mode in accordance with the configuration information. The configuration information includes at least one of: indication information indicating whether or not the UE is permitted to determine a resource in accordance with a network scheduling mode and/or an independent selection mode; QoS information of a D2D service corresponding to each resource allocation mode; and resource allocation information for determining the resource in the case that the UE adopts the independent selection mode.

The resource determination equipment may further include a reporting module (not shown) configured to report in advance support capability for the resource allocation mode and resource requirement information to the base station.

During the determination of the resource allocation modes, in the case that the indication information in the configuration information received by the reception module 61 indicates the resource allocation mode to be adopted by the UE and the UE supports the resource allocation mode, the determination module 62 is further configured to determine the resource in accordance with the resource allocation mode indicated in the indication information.

In addition, during the determination of the resource allocation modes, in the case that the configuration information received by the reception module 61 includes the QoS information of the D2D service corresponding to each resource allocation mode, the determination module 62 is further configured to select the resource allocation mode in accordance with QoS required by a currently-transmitted D2D signal.

In addition, during the determination of the resource allocation modes, in the case that the configuration information received by the reception module 61 includes the resource allocation information, the determination module 62 is further configured to determine that the independent selection mode is to be adopted and determine the resource in accordance with the resource allocation information.

Optionally, the configuration information is transmitted from the base station to the UE via broadcasting or dedicated signaling.

The network scheduling mode is a mode in which the UE transmits the D2D signal on the resource selected by the UE independently from a resource pool; and the independent selection mode is a mode in which the UE transmits the D2D signal on the resource indicated by the resource allocation information.

According to the embodiments of the present disclosure, the configuration information may be transmitted from the base station to the UE, so as to specifically indicate the resource allocation mode to be currently adopted. The UE may be efficiently switched between the different resource allocation modes in accordance with the configuration information from the base station. As a result, it is able to flexibly switch the resource allocation mode in accordance with the practical need, thereby to efficiently improve a resource utilization rate as well as the D2D communication performance.

A basic principle of the present disclosure has been described hereinbefore in conjunction with the embodiments. However, it should be appreciated that, after reading the descriptions of the present disclosure, it is able for a person skilled in the art, using a basic programming skill, to implement any or all steps of the method and any or all members of the equipment in any computing device (including a processor and a storage medium) or a network consisting of the computing devices, in the form of hardware, firmware, software or a combination thereof.

Hence, the purposes of the present disclosure may also be implemented by one program or a set of programs running on any computing device, e.g., a known general-purpose computer, or implemented merely by a program product including programs codes capable of implementing the method or device. In other words, this program product and a storage medium storing therein the program product also constitute a part of the present disclosure. Obviously, the storage medium may be any known storage medium or a storage medium that may occur in future.

The present disclosure further provides in some embodiments a storage medium (e.g., a Read Only Memory (ROM), a Random Access Memory (RAM), a hard disc, or a removable memory). A computer program for the allocation of resources may be stored in the storage medium and include program codes so as to: determine a resource allocation mode to be adopted by a UE, the resource allocation mode including a network scheduling mode and a UE autonomous selection mode; and transmit configuration information to the UE. The configuration information includes at least one of: indication information indicating whether or not the UE is permitted to determine a resource in accordance with the network scheduling mode and/or UE autonomous selection mode; QoS information of a D2D service corresponding to each resource allocation mode; and resource allocation information for determining the resource in the case that the UE adopts the UE autonomous selection mode.

The present disclosure further provides in some embodiments a storage medium (e.g., a ROM, a RAM, a hard disc, or a removable memory). A computer program for the allocation of resources may be stored in the storage medium and include program codes so as to perform following steps: receive configuration information from a base station, the configuration information including at least one of: indication information indicating whether or not the UE is permitted to determine a resource in accordance with a network scheduling mode and/or a UE autonomous selection mode, QoS information of a D2D service corresponding to each resource allocation mode, and resource allocation information for determining the resource in the case that the UE adopts the UE autonomous selection mode; determining the resource allocation mode in accordance with the configuration information.

The present disclosure further provides in some embodiments a computer program including program codes so as to: determine a resource allocation mode to be adopted by a UE, the resource allocation mode including a network scheduling mode and a UE autonomous selection mode; and transmit configuration information to the UE. The configuration information includes at least one of: indication information indicating whether or not the UE is permitted to determine a resource in accordance with the network scheduling mode and/or UE autonomous selection mode; QoS information of a D2D service corresponding to each resource allocation mode; and resource allocation information for determining the resource in the case that the UE adopts the UE autonomous selection mode.

The present disclosure further provides in some embodiments a computer program including program codes so as to: receive configuration information from a base station, the configuration information including at least one of: indication information indicating whether or not the UE is permitted to determine a resource in accordance with a network scheduling mode and/or a UE autonomous selection mode, QoS information of a D2D service corresponding to each resource allocation mode, and resource allocation information for determining the resource in the case that the UE adopts the UE autonomous selection mode; determine the resource allocation mode in accordance with the configuration information.

Figure 7:
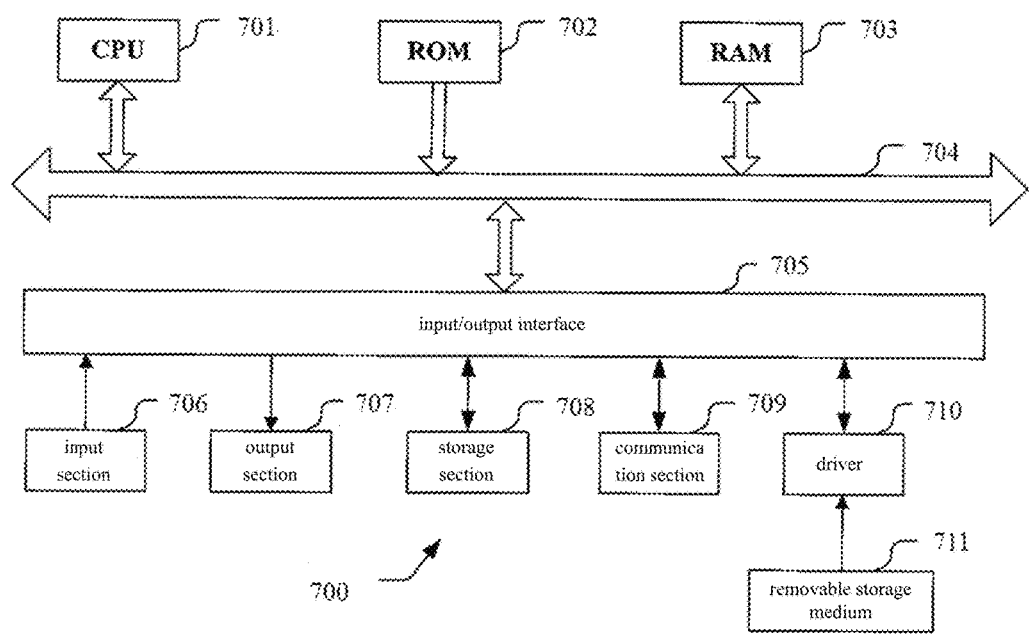
FIG. 7 is a block diagram of a computer which can implement technical solutions of the present disclosure according to one embodiment of the present disclosure.

In the case that the present disclosure is implemented in the form of software and/or firmware, programs may be installed in a computer with a dedicated hardware structure, e.g., a general-purpose computer 700 in FIG. 7, via the storage medium or a network, so as to achieve various functions.

In FIG. 7, a Central Processing Unit (CPU) 701 may execute various processings in accordance with the programs stored in a ROM 702 or the programs loaded into a RAM 703 via a storage section 708. Data desired for the operation of the CPU 701 may also be stored in the RAM 703 according to the practical need. The CPU 701, the ROM 702 and the RAM 703 are connected to each other via a bus 704. In addition, an input/output interface 705 is also connected to the bus 704.

An input section 706 (including a keyboard and a mouse), an output section 707 (including a display such as Cathode Ray Tube (CRT) or a Liquid Crystal Display (LCD), and a speaker), a storage section 708 (including a hard disk) and a communication section 709 (including a network interface card such as Local Area Network (LAN) card, and a Modem) may also be connected to the input/output interface 705. The communication section 709 is configured to perform the communication over a network, e.g., internet.

If desired, a driver 710 may also be connected to the input/output interface 705, and a removable storage medium 711 such as a magnetic disk, an optical disk, a magneto-optical disk or a semiconductor memory may be installed on the driver 710, so as to read the computer programs therefrom and install them into the storage section 708.

In the case that the above-mentioned processings are implemented via software, the programs may be installed from the network, e.g., internet, or the storage medium, e.g., the removable storage medium 711.

It should be appreciated that, the storage medium is not limited to the removable storage medium 711 in FIG. 7 in which the programs are stored and which may be distributed in such a manner as to be detachable from the device so as to provide the programs to a user. The removable storage medium 711 may include a magnetic disk (including a floppy disk (registered trademark), an optical disk (including Compact Disk Read Only Memory (CD-ROM) and Digital Video Disk (DVD), a magneto-optical disk (including Mini Disk (registered trademark) and a semiconductor memory. Or, the storage media may be a hard disk included in the storage section 708 and the ROM 702 in which the programs are stored, and the storage media may be distributed to the user together with the device including them.

It should be further appreciated that, according to the equipment and the method in the embodiments of the present disclosure, the members and/or steps may be subdivided and/or recombined, which shall also be deemed as equivalents of the present disclosure. In addition, the steps for executing the above-mentioned processings may be performed in a chronological order. Of course, some steps may also be performed in parallel, or independently of each other.

Although the present disclosure and its advantages have been described hereinabove, it should be appreciated that, various modifications, substitutions and alternations may be further made without departing from the spirit and scope defined by the appended claims. Such terms as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements.

What is claimed is:

1. A resource allocation method for Device-to-Device (D2D) signal transmission, comprising steps of:
    determining, by a base station, a resource allocation mode to be adopted by a User Equipment (UE), the resource allocation mode comprising a network scheduling mode and a UE autonomous selection mode; and
    transmitting, by the base station, configuration information to the UE, the configuration information comprising at least one of:
    indication information indicating whether or not the UE is permitted to determine a resource in accordance with the network scheduling mode and/or UE autonomous selection mode,
    Quality of Service (QoS) information of a D2D service corresponding to each resource allocation mode, and
    resource allocation information for determining the resource in the case that the UE adopts the UE autonomous selection mode,
    wherein the determining, by the base station, the resource allocation mode to be adopted by the UE further comprises:
    receiving, by the base station in advance, support capability for the resource allocation mode reported by the UE; and
    determining, by the base station, the resource allocation mode to be adopted by the UE in accordance with the support capability reported by the UE.

2. The resource allocation method according to claim 1, wherein the step of transmitting, by the base station, the configuration information to the UE comprises:
    transmitting, by the base station, the configuration information to the UE via broadcasting or dedicated signaling.

3. The resource allocation method according to claim 1, wherein in the case that the base station notifies the UE of determining the resource in accordance with the UE autonomous selection mode, the configuration information transmitted from the base station to the UE includes the resource allocation information.

4. The resource allocation method according to claim 1, wherein in the case that the base station indicates the UE to determine the resource in accordance with the network scheduling mode through the indication information, the base station further notifies the UE of information of a resource pool from which the resource is to be selected by the UE.

5. The resource allocation method according to claim 1, wherein the network scheduling mode is a mode in which the UE transmits a D2D signal on a resource selected by the UE initiatively from a resource pool; and the UE autonomous selection mode is a mode in which the UE transmits the D2D signal on a resource indicated by the resource allocation information.

6. A resource determination method for Device-to-Device (D2D) signal transmission, comprising steps of:
   receiving, by a User Equipment (UE), configuration information from a base station, the configuration information including at least one of: indication information indicating whether or not the UE is permitted to determine a resource in accordance with a network scheduling mode and/or a UE autonomous selection mode, Quality of Service (QoS) information of a D2D service corresponding to each resource allocation mode, and resource allocation information for determining the resource in the case that the UE adopts the UE autonomous selection mode; and
   determining, by the UE, the resource allocation mode in accordance with the configuration information;
   wherein prior to the receiving, by the UE, the configuration information from the base station, the method further comprises:
   reporting, by the UE in advance, support capability for the resource allocation mode to the base station.

7. The resource determination method according to claim 6, wherein in the step of determining the resource allocation mode, in the case that the indication information in the configuration information received by the UE indicates the resource allocation mode to be adopted by the UE and the UE supports the resource allocation mode, the UE determines the resource in accordance with the resource allocation mode indicated in the indication information.

8. The resource determination method according to claim 6, wherein in the step of determining the resource allocation mode, in the case that the configuration information received by the UE comprises the QoS information of the D2D service corresponding to each resource allocation mode, the UE selects the resource allocation mode in accordance with QoS required by a currently-transmitted D2D signal.

9. The resource determination method according to claim 6, wherein in the step of determining the resource allocation mode, in the case that the configuration information received by the UE comprises the resource allocation information, the UE determines that the UE autonomous selection mode is to be adopted and determines the resource in accordance with the resource allocation information.

10. The resource determination method according to claim 6, wherein the configuration information is transmitted from the base station to the UE via broadcasting or dedicated signaling.

11. The resource determination method according to claim 6, wherein the network scheduling mode is a mode in which the UE transmits a D2D signal on a resource selected by the UE initiatively from a resource pool, and the UE autonomous selection mode is a mode in which the UE transmits the D2D signal on a resource indicated by the resource allocation information.

12. A resource allocation equipment for Device-to-Device (D2D), comprising:
   a determination module configured to determine a resource allocation mode to be adopted by a User Equipment (UE), the resource allocation mode comprising a network scheduling mode and a UE autonomous selection mode; and
   a transmission module configured to transmit configuration information to the UE, the configuration information including at least one of:
   indication information indicating whether or not the UE is permitted to determine a resource in accordance with the network scheduling mode and/or UE autonomous selection mode,
   Quality of Service (QoS) information of a D2D service corresponding to each resource allocation mode, and
   resource allocation information for determining the resource in the case that the UE adopts the UE autonomous selection mode;
   wherein the equipment further comprises a reception module configured to receive in advance support capability for the resource allocation mode reported by the UE,
   wherein the determination module is further configured to determine the resource allocation mode to be adopted by the UE in accordance with the support capability reported by the UE.

13. The resource allocation equipment according to claim 12, wherein the transmission module is further configured to transmit the configuration information to the UE via broadcasting or dedicated signaling.

14. The resource allocation equipment according to claim 12, wherein in the case that it is required to notify the UE of determining the resource in accordance with the UE autonomous selection mode, the configuration information transmitted by the transmission module to the UE merely comprises the resource allocation information.

15. The resource allocation equipment according to claim 12, wherein in the case that it is required to indicate the UE to determine the resource in accordance with the network scheduling mode through the indication information, the transmission module is further configured to notify the UE of information of a resource pool from which the resource is to be selected by the UE.

16. The resource allocation equipment according to claim 12, wherein the network scheduling mode is a mode in which the UE transmits a D2D signal on a resource selected by the UE initiatively from a resource pool, and the UE autonomous selection mode is a mode in which the UE transmits the D2D signal on a resource indicated by the resource allocation information.

* * * * *